H. MOORE.
VALVE RESEATER.
APPLICATION FILED SEPT. 11, 1911. RENEWED FEB. 24, 1914.
1,113,674.   Patented Oct. 13, 1914.
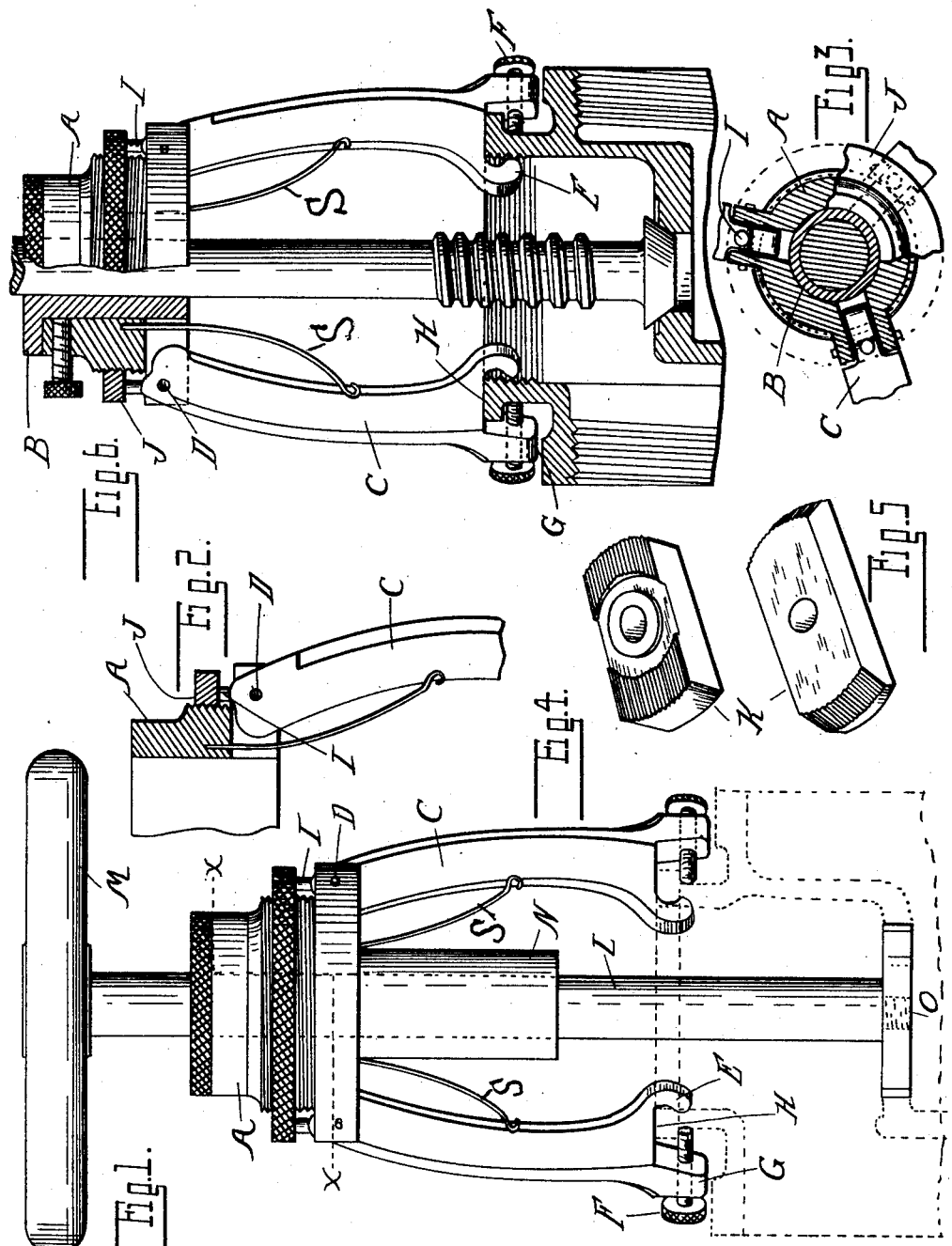

UNITED STATES PATENT OFFICE.

HIRAM MOORE, OF HANCOCK, MICHIGAN.

VALVE-RESEATER.

1,113,674. Specification of Letters Patent. Patented Oct. 13, 1914.

Application filed September 11, 1911, Serial No. 648,813. Renewed February 24, 1914. Serial No. 820,661.

*To all whom it may concern:*

Be it known that I, HIRAM MOORE, a citizen of the United States of America, residing at Hancock, in the county of Houghton and State of Michigan, have invented certain new and useful Improvements in Valve-Reseaters, of which the following is a specification, reference being had therein to the accompanying drawings.

The invention relates to apparatus for the re-seating of valves and it is the object of the invention to obtain a simple and inexpensive construction of device which is adapted for use in re-seating valves of various sizes and which may be used without disconnecting said valves from the pipe line in which they are located.

To this end the invention consists in the construction as hereinafter set forth.

In the drawings,—Figure 1 is an elevation of the re-seater; Fig. 2 is a longitudinal section through one of the hinged connections; Fig. 3 is a horizontal section; Figs. 4 and 5 are detail views of different cutting tools; and Fig. 6 is a view similar to Fig. 1, partly in section.

In the use of the various piping systems in which valves are located it frequently becomes necessary to re-seat the valves which have become leaky. For this purpose various devices have been employed but in order to effectually accomplish the purpose it is necessary to have means for accurately centering and alining the cutting or grinding member. With the present construction the re-seating device is capable of being quickly engaged with the valve case and of being accurately alined.

As shown, A is a head having a central bore forming a journal for the valve stem or re-seating tool stem. To accommodate various sizes of valves, the head A is formed with a bore for the maximum size of stem, and for use in connection with smaller stems, bushings B are provided.

C are legs or supporting standards for the head A which are pivotally attached thereto by pins D being spaced around the head. I preferably employ three of these legs C and provide each at its lower end with a hooked extension E which is adapted to engage the inner face of the valve case when the cap thereof is removed. Each leg is also provided with a thumb-screw F engaging a bearing G opposite the hook E, the arrangement being such that the legs may be firmly clamped to the case by manipulation of said thumb-screws. Springs S are preferably provided to hold the legs C normally extended.

To obtain accuracy in alinement, the legs C are made of uniform length, their lower ends H having a bearing surface for resting upon the machined flange of the valve case. At the upper ends of the legs are bearings I preferably formed by projecting pins or lugs.

J is a collar having a threaded engagement with the head A and which is adapted to be adjusted downward into contact with the lugs or pins I. As the length from the bearing H to the bearing pin I is absolutely the same in all of the legs C, it is evident that the tightening of the collar J will force the head A to assume a position centrally alined with the valve seat. Thus if the valve stem is engaged with the head either directly or by a suitable bushing B, it will be held in accurate alinement with the valve seat which will permit of grinding the valve to its seat with great accuracy.

In many cases the valves are so badly worn that re-seating by grinding alone would be a lengthy operation. I have therefore provided a series of cutter tools K adapted for use in refacing the seats of various valves, said tools being engageable with a stem L which is provided with an operating handle M. The stem L is engaged with the head A by the placing therein of a long bushing N which forms a journal in which the stem may be rotated. This enables the operator to select a proper tool K, attaching it to the stem by means of a threaded stud O on the end thereof and then to reface the valve by rotating the handle M and simultaneously applying pressure to the tool while in contact with the valve seat.

In use, to re-seat the valve it is merely necessary to remove the cap or gland fitting and to engage the leg C with the valve case and adjust the collar J in the manner already described. If the seat requires refacing with the cutting tool, this operation may be performed by the use of the stem L and cutters K as has been described. On the other hand, the reseating may be effected by grinding and the valve stem is engaged with the head A by the selection of a suitable bushing B and abrasive material being placed on the valve, it may be quickly ground to a true bearing on its seat as shown in Fig. 6.

What I claim as my invention is:

1. A valve reseating device comprising a centrally bored head, a plurality of legs hinged to said head at spaced points there about and provided at their lower ends with means engaging the valve case both interiorly and exteriorly to clamp the legs thereto, said legs being provided at their upper ends beyond the pivotal points with transverse end faces, and a collar surrounding said head and having a threaded engagement therewith and adapted to contact with the transverse end faces of the said legs to position the head and its bearing in proper relation to the valve seat.

2. A valve reseating device comprising a centrally bored head, a plurality of legs hinged to the head in spaced relation thereabout and provided at their lower ends with means engaging the valve case both interiorly and exteriorly to clamp the legs thereto, said legs having lugs projecting from the upper ends thereof beyond the pivotal points, and a collar in threaded engagement with the head and contacting with the end faces of the lugs to position the head and its bearing in proper relation to the valve seat.

3. A valve reseating device comprising a centrally bored head, a plurality of legs pivotally secured to the head at spaced points thereabout, the lower ends of said legs being provided with means for engaging the inner face of the valve case and adjustable means engaging the outer face of the valve case for rigidly clamping the lower ends of the legs thereto, and adjustable means on said head to engage the upper ends of said legs to position the head in proper alinement with the valve seat.

4. A valve reseating device comprising a head, a plurality of legs hinged to the head at spaced points thereabout, said head having a tool bearing positioned centrally of the legs, each of said legs having a transverse bearing face at its lower end, said bearing faces being located at equal distances from the head and adapted to engage with a transverse bearing surface on the valve case, said legs also having fixed longitudinal bearing faces to engage the interior of the valve case, and adjustable members at the lower ends of the legs and arranged opposite the said longitudinal bearing faces and coacting therewith to clamp the valve case interiorly and exteriorly thereof.

5. In a valve reseating device comprising a head, a plurality of legs hinged to the head at spaced points thereabout, said head having a tool bearing positioned centrally of the legs, the legs being provided with transverse bearing faces at their lower ends, said bearing faces being located at equal distances from the head and adapted to engage a transverse bearing surface on the valve case, the legs being provided at the inner terminals of the transverse bearing faces with integral projecting lugs or faces arranged to extend into and engage the interior of the valve case, and adjustable members carried by the legs at the outer terminals of the said transverse bearing faces to engage the exterior of the valve case, whereby the legs are clamped thereon.

6. A valve reseating device comprising a head, a plurality of legs hinged to said head at spaced points thereabout, said head having a tool bearing positioned centrally of the legs, the legs being provided with transverse bearing faces at their lower ends, said bearing faces being at equal distances from the head and adapted to engage a transverse bearing surface on the valve case, the legs being provided at the inner and outer terminals of the transverse bearing faces with spaced inner and outer integral lugs or projections, the inner lugs or projections having longitudinal bearing faces to fit against the interior of the valve case, and clamping screws mounted in the outer lugs or projections for engaging the exterior of the valve case, and adjustable means carried by the said head to engage the upper ends of the legs to accurately center the head.

7. In a valve reseating device, the combination with a centrally apertured head, of a plurality of legs hinged to the head at spaced points thereabout, the legs being provied at their lower ends with hook portions to engage the inner face of the valve case, clamping screws mounted in the lower ends of the legs opposite the said hook portions, and coacting therewith to clamp the valve case interiorly and exteriorly thereof, projections on the upper ends of the legs beyond their pivots and a collar adjustably mounted on the head and adapted to engage said projections to accurately center the head.

In testimony whereof I affix my signature in presence of two witnesses.

HIRAM MOORE.

Witnesses:
C. T. HARRINGTON,
RYAN HARRINGTON.